(12) United States Patent
Sullivan et al.

(10) Patent No.: US 11,477,298 B2
(45) Date of Patent: *Oct. 18, 2022

(54) OFFLINE CLIENT REPLAY AND SYNC

(71) Applicant: ORACLE INTERNATIONAL CORPORATION, Redwood Shores, CA (US)

(72) Inventors: Blake Sullivan, Redwood City, CA (US); Kentaro Kinebuchi, San Francisco, CA (US); Jing Wu, Foster City, CA (US); Min Lu, Fremont, CA (US); Andrew Schwartz, Newton, MA (US); Max Starets, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,072

(22) Filed: Jun. 2, 2021

(65) Prior Publication Data
US 2021/0289045 A1    Sep. 16, 2021

Related U.S. Application Data

(63) Continuation of application No. 16/439,398, filed on Jun. 12, 2019, now Pat. No. 11,070,648.
(Continued)

(51) Int. Cl.
*H04L 29/08* (2006.01)
*H04L 67/00* (2022.01)
(Continued)

(52) U.S. Cl.
CPC ............. *H04L 67/34* (2013.01); *G06F 9/546* (2013.01); *G06F 9/547* (2013.01); *H04L 67/025* (2013.01); *H04L 67/1095* (2013.01); *H04L 67/142* (2013.01); *H04L 67/54* (2022.05); *H04L 67/5683* (2022.05)

(58) Field of Classification Search
CPC . H04L 67/2861; H04L 67/1095; H04L 67/02; H04L 67/2842; G06F 9/546; H04I 67/142; H04I 67/2857
See application file for complete search history.

(56) References Cited

U.S. PATENT DOCUMENTS 7,899,917 B2    3/2011 Chitre et al.
8,793,347 B2    7/2014 Chow et al.
(Continued)

OTHER PUBLICATIONS

"Using the application cache" https://developer.mozilla.org/en-us/docs/Web/HTML/Using_the_application_cache—16 pages.
(Continued)

*Primary Examiner* — Chirag R Patel
(74) *Attorney, Agent, or Firm* — Trellis IP Law Group, PC (57) ABSTRACT

An example system and method facilitates operation of a networked software application that communicates with a network resource during periods of intermittent network connectivity and includes determining when a networked software application is offline and when it is online; selectively intercepting one or more request messages from the networked software application addressed to a network resource when the software application is offline, resulting in a store of intercepted request messages; detecting when the networked software application transitions from being offline to being online; and selectively issuing the one or more request messages to the network resource in a sequence in which the one or more request messages were stored in the store of intercepted request messages. In a more specific embodiment, the system is implemented via an offline toolkit for capturing REpresentational State Transfer (REST) calls when the networked software application (client) is offline; then selectively replaying the calls when the client reconnects, i.e., goes online.

20 Claims, 8 Drawing Sheets

Related U.S. Application Data (60) Provisional application No. 62/739,536, filed on Oct. 1, 2018.

(51) Int. Cl.

| | | |
|---|---|---|
| *G06F 9/54* | (2006.01) | |
| *H04L 67/025* | (2022.01) | |
| *H04L 67/1095* | (2022.01) | |
| *H04L 67/142* | (2022.01) | |
| *H04L 67/54* | (2022.01) | |
| *H04L 67/5683* | (2022.01) | |

(56) References Cited

U.S. PATENT DOCUMENTS

2002/0083145 A1\* 6/2002 Perinpanathan ........ H04L 29/06 709/219
2006/0004927 A1 1/2006 Rehman et al.
2006/0230184 A1 10/2006 Velline et al.
2008/0086540 A1 4/2008 Scott et al.
2009/0172792 A1\* 7/2009 Backhouse ............. G06F 21/33 726/6

OTHER PUBLICATIONS

"Service Worker API" https://developer.mozilla.org/en-us/docs/Web/API/Service_Worker_API—7 pages.
"Service Workers" https://caniuse.com/#feat=serviceworkers—2 pages.
"Window.localStorage" https://developer.mozilla.org/en-us/docs/Web/API/Window/localStorage—4 pages.
Mohammad Faiz, Data Synchronization in Distributed Client-Server Applications, Mar. 7 & 18, 2016, 2nd IEEE International Conference on Engineering and Technology (ICETECH), Mar. 17-18, 2016, Coimbatore, TN, India.

\* cited by examiner

OFFLINE CLIENT REPLAY AND SYNC

CROSS REFERENCES TO RELATED APPLICATIONS

This application is a continuation of U.S. patent application Ser. No. 16/439,398, entitled OFFLINE CLIENT REPLAY AND SYNC, filed Jun. 12, 2019, which claims the benefit of U.S. Provisional Patent Application Ser. No. 62/739,536, entitled OFFLINE CLIENT REPLAY AND SYNC, filed on Oct. 1, 2018, which is hereby incorporated by reference as if set forth in full in this application for all purposes.

This application is further related to U.S. Provisional Patent Application Ser. No. 62/741,135, entitled SYSTEM FOR OFFLINE OBJECT BASED STORAGE AND MOCKING OF REST RESPONSES, filed on Oct. 4, 2018, which is hereby incorporated by reference as if set forth in full in this application for all purposes.

BACKGROUND

The present application relates to computing and more specifically to systems and methods for facilitating development and operation of networked software applications that can efficiently handle intermittent network connectivity.

Software mechanisms for handling intermittent or limited network connectivity are employed in various demanding applications, including mobile enterprise applications, automotive computing applications, and so on. Such applications often demand efficient mechanisms for accommodating network disconnection and reconnection scenarios.

For example, mobile apps used by certain field service workers may lose network connectivity over extended periods. Conventionally, a browser may locally cache some data for a given webpage or app, but the cached data may be of limited use for some needed software operations or functions.

Furthermore, in certain scenarios, any work that the field service worker has performed using the locally cached data may be lost or otherwise not relevant if connectivity is reestablished, and the browser refreshes the page upon reconnect.

SUMMARY

An example method facilitates operation of a networked software application (called the client software application, or simply, client) that communicates with a network resource (e.g., web service) during periods of intermittent network connectivity. The example method includes determining when a networked software application is offline and when it is online; selectively intercepting one or more request messages from the networked software application addressed to a network resource when the software application is offline, resulting in a store of intercepted request messages; detecting when the networked software application transitions from being offline to being online; and selectively issuing the one or more request messages to the network resource in a sequence in which the one or more request messages were stored in the store of intercepted request messages.

In a more specific embodiment, the client includes a browser, and the network resource includes a REpresentational State Transfer (REST) service or Application Programming Interface (API). The client acts as a REST client of the REST service or API, and may do so via an intermediate website running webpage code that communicates with the REST service or API. Similarly, the webpage code may also be equipped with functionality for implementing embodiments discussed herein when communicating with the backend REST service or API on behalf of the original requesting client.

The request message may include a HyperText Transfer Protocol (HTTP) request message, which may include an XHR request (XML HTTP Request). The store of intercepted request messages may be implemented via a synchronization log that includes time stamps for each intercepted request message that is stored in the synchronization log.

The step of selectively intercepting may further include intercepting only request messages that meet one or more predetermined conditions as specified via a configured scope. The step of selectively issuing may further include generating one or more mock responses to each of the one or more intercepted request messages; and issuing the one or more mock responses to the networked software application in response to intercepting one or more request messages.

The specific example embodiment may be implemented via a JavaScript Extension Toolkit (JET) that acts as an offline toolkit for capturing REST calls when the client is offline; then replaying the captured REST calls in a guaranteed order once the client reconnects, i.e., goes online.

The stored/cached request messages in the synchronization log may represent messages meeting one or more predetermined criterion, i.e., meeting a configured scope. In other embodiments, the system may provide mock responses to the client when the client is offline.

Accordingly, the offline persistent toolkit and associated embodiments discussed herein greatly simplify application development, e.g., by providing a response caching solution that works well across modern browsers. The toolkit covers common caching cases with a minimal amount of application-specific coding, but provides flexibility to cover nontrivial cases as well. In addition to providing the ability to cache complete response payloads, the toolkit supports "shredding" of REST response payloads into objects that can be stored, queried, and updated on the client device while offline.

A further understanding of the nature and the advantages of particular embodiments disclosed herein may be realized by reference of the remaining portions of the specification and the attached drawings.

DETAILED DESCRIPTION OF EMBODIMENTS

In an example use case scenario, a worker (e.g., a business representative) uses an embodiment to handle messaging of a client software application when the software application is offline and online. In the example scenario, a client UI (e.g., including one or more User Interface display screens of a client software application) and associated interactions pertain to a scenario involving a representative traveling to various locations (e.g., store locations) that maintain inventories, where the representative is tasked with tracking inventory, e.g., how much of a certain product is still available at a certain store. The associated business also has warehouse locations. The representative is using a mobile device, which may or may not have Internet access at the various target location.

In the example use case scenario, the representative is to record the inventory amounts using the mobile device and accompanying client software application. When the representative returns back to the office, the representative may synchronize with the server. The representative will be able to order (using their mobile device) what products are in short supply. The orders will also be synched (with the server) when the representative returns to their office where Internet connectivity is established. The representative may also be tasked with obtaining a store-manager approval or signature on a given order. The signature may be stored in a binary file that also gets synced via the mobile device once Internet connectivity is reestablished.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

An application server may be any server that includes computing resources for running software applications that may provide data and/or functionality to one or more client devices. An application server may back one or more web pages running on one or more web servers, wherein the web pages facilitate providing UI controls to enable a user of client device to use the client to interact with functionality afforded by the underlying application server and applications and/or data running thereon and/or stored thereby. Accordingly, an application server may be implemented via a software framework (and/or hardware that supports the software framework, depending upon the context in which the term is used) for providing computing resources for supporting the creation of and running of software applications, e.g., web applications, including web services, APIs, database applications, and so on, that provide data and/or functionality to other software applications, called client applications (or simply clients).

A networked computing environment may be any computing environment that includes intercommunicating computers, i.e., a computer network. Similarly, a networked software application may be computer code that is adapted to facilitate communicating with or otherwise using one or more computing resources, e.g., servers, via a network. Similarly, a networked software application may be any software application (e.g., a mobile app, desktop browser plugin, etc.) that communicates with one or more computing resources via a computer network.

A web service may be any computer code and associated functionality that is adapted to be called by an application or other service or process whose code is stored in a separate location (e.g., on another computer or memory storage location or device) from the software service and whose interface with the software service includes a Web Services Description Language (WSDL) interface.

Generally, web services, also simply called services herein, provide functionality, e.g., capabilities, that may be reused by different applications, processes, or web services (that may be distributed across a network), which access the functionality via a WSDL interface consistent with a description of the web service. A web services model may represent a loosely coupled integration model for allowing flexible integration of various network-distributed applications or processes.

A user interface may be any collection of hardware and/or software adapted to facilitate illustrating data and/or providing access to software functionality associated with the user interface. A software user interface may be any collection of one or more user interface display screens associated with software. A software UI is often characterized by a UI framework or architecture, which specifies an organization of data and functionality of a software application and which may further include features for navigating the software UI.

For clarity, certain well-known components, such as hard drives, processors, operating systems, power supplies, routers, the Internet, Internet Service Providers (ISPs), virtual machines, middleware, JavaServer Faces (JSF) frameworks and servlets, certain types of metadata service providers, runtime service connectors, persistence managers, metadata transformation utilities, authentication modules, identity providers, token validators, Asynchronous JavaScript and XML (AJAX) engines, and so on, are not necessarily explicitly called out in the figures. However, those skilled in the art with access to the present teachings will know which components to implement and how to implement them to meet the needs of a given implementation.

Figure 1:
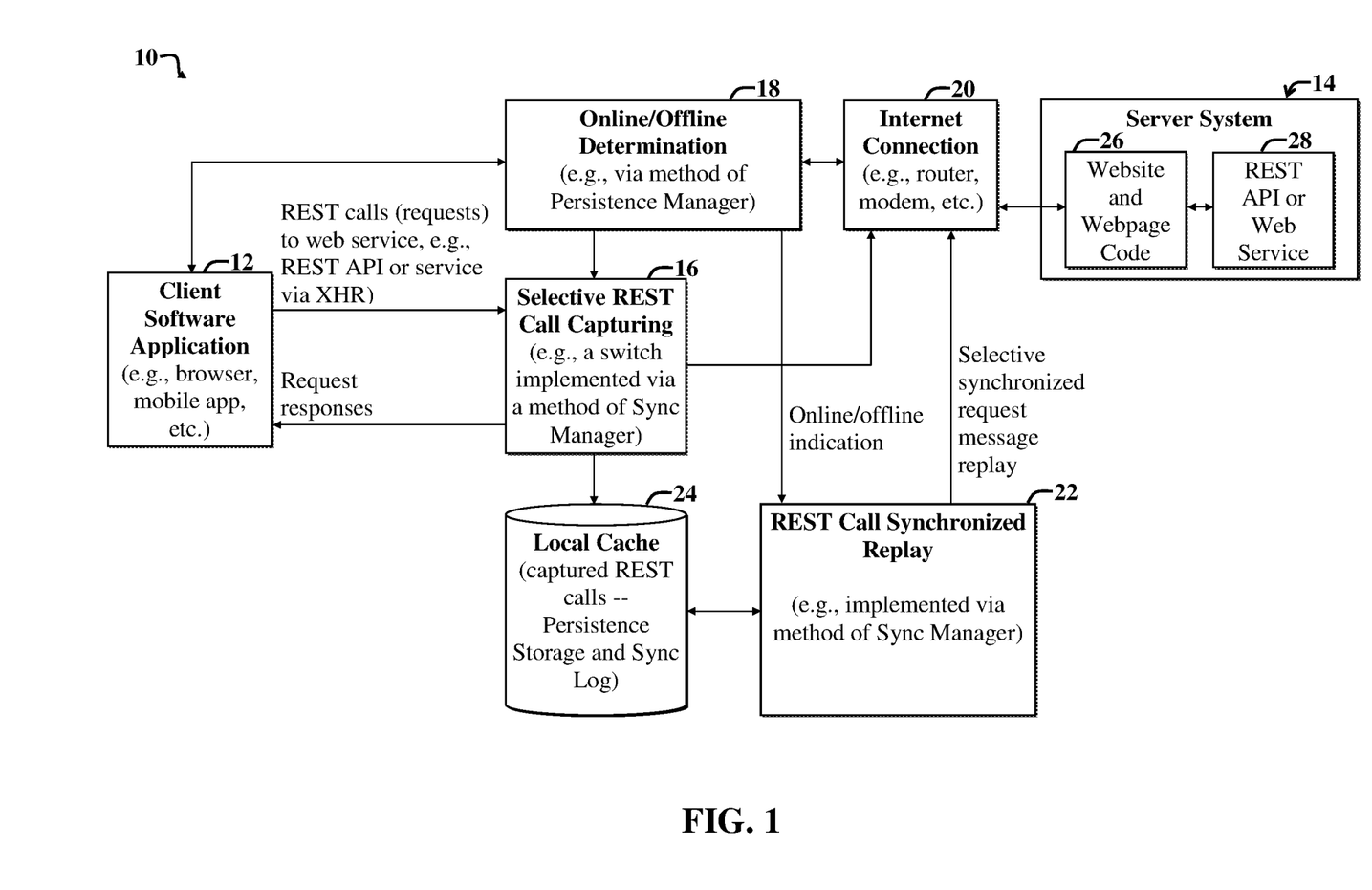
FIG. 1 is a block diagram showing a first example system and accompanying computing environment for facilitating handling request messages from a client software application (e.g., a browser) when the client software application is offline, and then selectively replaying request messages to the endpoint computing resource associated with each of the request messages in a guaranteed synchronized order after the client software application transitions from offline to online.

FIG. 1 is a block diagram showing a first example system 10 and accompanying computing environment for facilitating handling request messages (e.g., REST calls) from a client software application (e.g., a browser, mobile app, or other client-side networked software application) 12 when the client software application is offline, and then selectively replaying request messages to an endpoint computing resource (e.g., REST API or web service) 28 associated with each of the request messages in a guaranteed synchronized order after the client software application 12 transitions from offline to online.

In the present example embodiment, the client software application 12 communicates with a server-side computing resource 28, i.e., a REpresentational State Transfer (REST) Application Programming Interface (API) or web service 28 hosted by one or more servers (e.g., web servers and application servers) 14 via interfacing modules 16-22 and a website and accompanying webpage code 26.

The example interfacing modules 16-22 implemented as part of a software library or toolkit (also called a Software Development Kit (SDK)) that interfaces the client software application 12 with the server system 14.

The interfacing modules 16-22 include a selective REST call capturing module 16 in communication with an online/offline determination module 18, an Internet connection 20 (e.g., which may include a modem, router, etc.), and a local cache 24, also called a persistence storage, which includes a synchronization log (also called sync log) for capturing REST calls, e.g., HyperText Transfer Protocol (HTTP) request messages such as XML HTTP Request (XHR) messages in association with time stamps or other means for subsequently replaying the captured messages in a particular order, i.e., a synchronized order. A REST call synchronized replay module 22 also communicates with the online/offline determination module 18, the local cache 24, and the Internet connection 20.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the selective REST call capturing module 16 and the REST call synchronized replay module 22 may be part of the same synchronization manager (also called sync manager) module or class.

In operation, the client software application (also simply called the client herein) 12, issues request messages to the webpage code 26 and associated backend REST API or web service 28, which are hosted by the server system 14, e.g., to obtain data responsive to one or more events detected responsive to user interaction with a User Interface (UI) of the client software application. For example, when the client software application 12 is implemented via a browser, a user interacting with a UI implemented via HTML and JavaScript associated with the website and webpage code 26 may generate one or more events that trigger JavaScript calls that are then routed through an Asynchronous JavaScript and XML (AJAX) engine (or other suitable interfacing software) and converted into the associated REST call(s). The REST calls are routed through the selective REST call capturing module 16.

In certain implementations, the REST call capturing module 16 may act as a switch that selectively passes request messages on to the server system 14 via the Internet connection 20 when the Internet connection 20 is live, i.e., operational and coupled to a network (e.g., the Internet) that enables communications between the client 12 and the server system 14. When the Internet connection 20 is down, or the client 12 is otherwise unable to use the Internet connection 20 to communicate with the server system 14 via the network, the selective REST call capturing module 16 is activated and begins capturing REST calls, i.e., request messages, issued from the client 12, as discussed more fully below. Note however, that embodiments are not limited to capturing REST calls when the client software application 12 is offline, and may also capture REST calls and associated server responses when the client software application 12 is online, e.g., to facilitate optimization of network resources when a given REST call can be handled locally without needing to interact with the server system 14.

When the Internet connection 20 is live and the client 12 is using the Internet connection 20, the client 12 is said to be online. Similarly, when the Internet connection 20 is down or when the client 12 otherwise does not have access to the Internet connection 20, the client 12 is said to be offline.

The online/offline determination module 18 includes code for detecting when the client 12 is online or offline, and issuing corresponding online/offline status indications to the selective REST call capturing module 16. These status indications enable the REST call capturing module 16 to determine when to capture and store (in the local cache 24) the REST calls issued from the client 12.

Similarly, these status indications enable the REST call synchronized replay module 22 to determine when to replay captured REST calls from the cache 24, i.e., forward them in a precise order to the server system 14. The precise order, i.e., synchronized order, may be the same order in which the REST calls were captured in the cache 24. Sync log data, e.g., time-stamping, or other suitable mechanisms, marks the order in which REST calls were captured and stored in the cache 24. This facilitates synchronous replay of the captured REST calls to the server-side computing resources 26, 28.

Generally, when the server-side REST API or web service 28 detects REST calls via the webpage code 26 used by the client 12, it generates corresponding response messages. The response messages may include, for example, data retrieved from a backend database, where the data is to be served to the webpage code 26 for access by the client 12 via a UI display screen shown on the client 12 (which may include or represent a browser).

Note that various modules 16, 18, 22 of the system 10 may be implemented via software that may be plugged into the client 12 as part of a pluggable library or toolkit. The library may include a persistence manager for implementing various types of software functionality, including functionality for implementing the online/offline determination 18, etc. The functionality may be implemented via methods of computing language classes, e.g., JavaScript classes.

Examples of methods that may be implemented via a persistence manager class include a method to construct new persistence manager; call browser fetch using browser API, selectively bypassing persistence framework; selectively force persistence manager offline; get contents of persistence manager cache 24; get a registration object for the service URL (of the REST API or web service 28); get all registration objects; instantiate a sync manager; check if browser (e.g., client 12) and persistence manager are online (i.e., implement the online/offline determination 18), and so on.

Generally, the sync manager used to implement the REST call synchronized replay module 22 and the selective REST call capturing module 16 supports synchronization capabilities for requests which were made when offline. Example methods that may be implemented via a persistence manager class include a method to synchronize the sync log 24 with the server system 14; construct new persistence sync manager; add an event listener; remove an event listener; selectively process the sync log 24; replay requests (i.e., REST calls, also called HTTP requests, HTTP request messages, REST requests, or REST request messages herein); insert request into the sync log 24; retrieve data from sync log 24; remove a request from the sync log 24; update a request in the sync log, thereby replacing it, and so on.

Accordingly, the sync manager instance can be obtained via a method of the persistence manager (persistenceManager.getSyncManager( ) API) and supports various operations, including retrieving the sync log; invoking a sync( ) API to replay the requests which were made while offline; inserting/removing requests from the sync log 24, adding event listeners for sync operations; performing undo/redo operations for shredded local data, which were made as a result of those requests, and so on.

Figure 2:
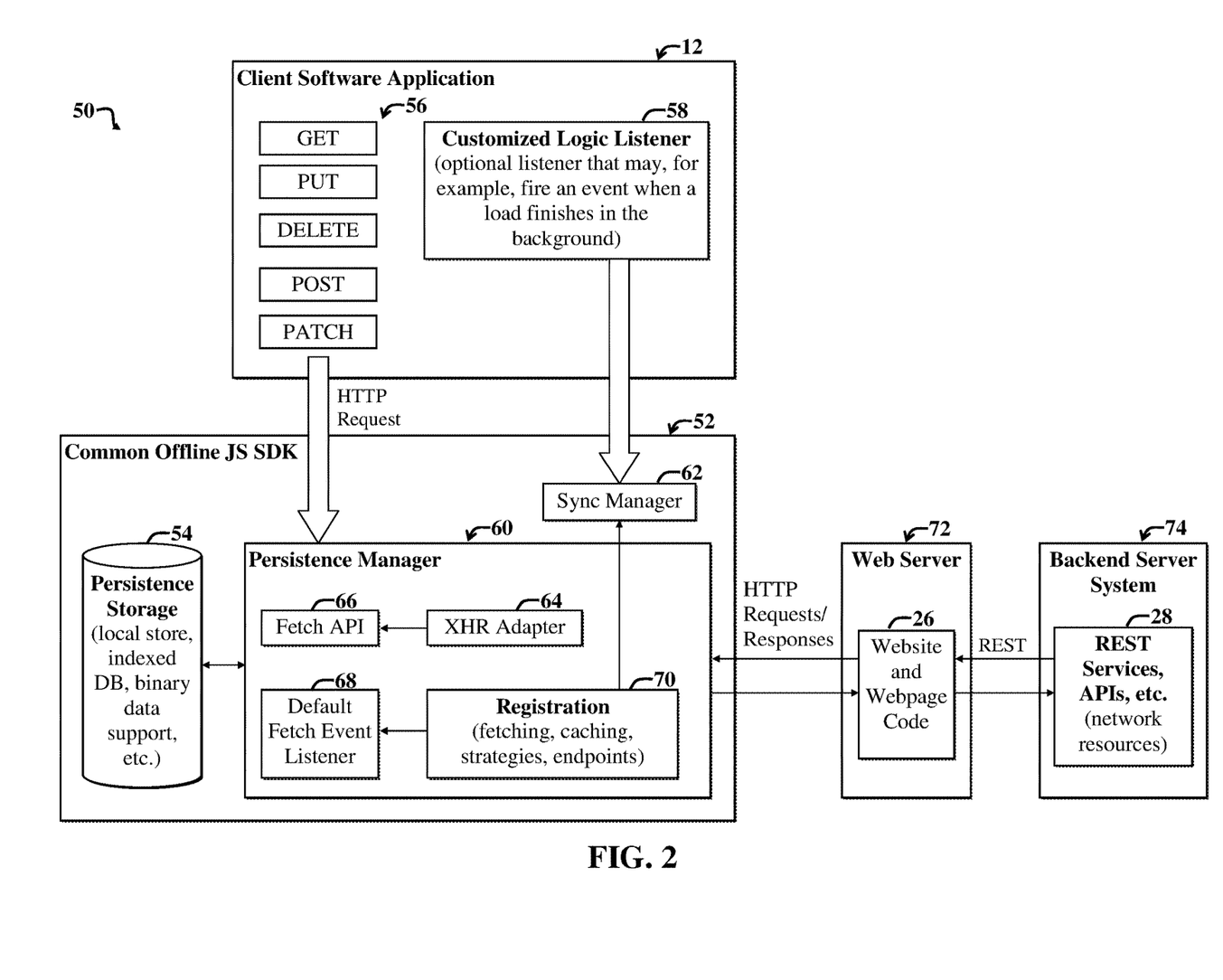
FIG. 2 is a block diagram showing a second example system and accompanying computing environment that further illustrates example offline Software Development Kit (SDK), library, or other interface suitable for implementing selective client request message capture and storage, when offline, and subsequent replay, and synchronization with the addressed computing resource(s) when the network connection is reestablished, i.e., the client software application goes online.

FIG. 2 is a block diagram showing a second example system 50 and accompanying computing environment that further illustrates example offline Software Development Kit (SDK), library, API or other toolkit or interface mechanism suitable for implementing selective client request message capture and storage, when offline, and subsequent replay, and synchronization with the addressed computing resource(s) when the network connection is reestablished, i.e., the client 12 goes online.

For illustrative purposes, the client 12 is shown including functionality for implementing various types of REST calls 56, including get, put, delete, post, and patch. A customized logic listener 58 can detect events triggered by user interaction with one or more UI controls of a UI (e.g., UI of a web page) associated with or used by the client 12.

The client is shown communicating with a common offline JavaScript (JS) Software Development Kit (SDK) 52 that acts as an interface between the client 12 and a web server 72, where the web server 72 interfaces the common offline JS SDK 52 with a backend server, e.g., application server 74. The servers 72, 74 may form part of the server system 14 of FIG. 1.

The example common offline JS SDK 52 includes a persistence manager 60 in communication with a sync manager 62 and a persistence storage 54, which may correspond to the local cache 24 of FIG. 1. The persistence manager 60 receives REST calls issued via one or more of the REST methods 56 employed by the client 12. Fetching functionality 64, 66, including a fetch API 66 and XHR adapter 64 facilitate issuing HTTP requests to the web server 72.

The persistence manager 60 is also shown including a default fetch event listener 68 (e.g., with functionality to detect when a fetch event corresponding to a request message occurs) and a registration module 70 for enabling and maintaining registrations of activities (e.g., fetching, caching, etc.), strategies, and endpoints (e.g., via URLs associated with the endpoints. An endpoint may refer, for example, to the REST API or web service 28.

Figure 3:
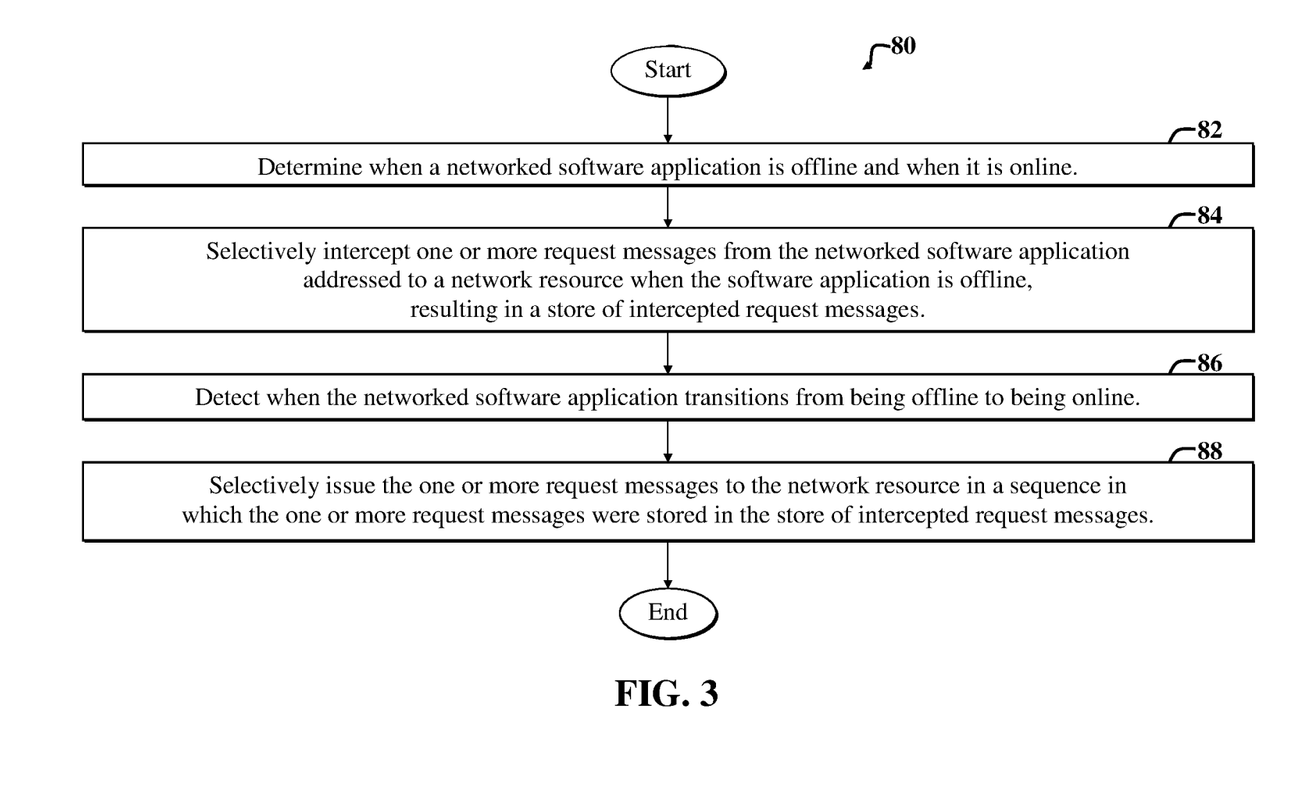
FIG. 3 is a flow diagram of an example method usable with the embodiments of FIGS. 1-2.

FIG. 3 is a flow diagram of an example method 80 usable with the embodiments of FIGS. 1-2. The example method 80 facilitates operation of a networked software application (e.g., the client 12 of FIGS. 1 and 2) that communicates with a network resource during periods of intermittent network connectivity, including when the client is offline.

With reference to FIGS. 1 and 3, the example method 80 includes a first step 82 which involves determining when a networked software application is offline and when it is online. The determination may be made by the online/offline determination module 18 of FIG. 1.

A second step 84 includes selectively intercepting one or more request messages (e.g., via the selective REST call capturing module 16 of FIG. 1) from the networked software application (e.g., client 12 of FIG. 1) addressed to a network resource (e.g., the REST API or web service 28 of FIG. 1) when the software application is offline, resulting in a store (e.g., the local cache 24 of FIG. 1) of intercepted request messages.

A third step 86 includes detecting when the networked software application transitions from being offline to being online (e.g., via the online/offline determination module 18 of FIG. 1).

A fourth step 88 includes selectively issuing (e.g., via the REST call synchronized replay module 22 of FIG. 1) the one or more request messages to the network resource in a sequence in which the one or more request messages were stored in the store of intercepted request messages.

Note that the first example method 80 may be modified, without departing from the scope of the present teachings. For example, the method 80 may further specify that the networked software application includes a browser, and the network resource includes a REST service or API (e.g., corresponding to block 28 of FIGS. 1 and 2). The networked software application may act as (or represent) a REST client of the REST service or API.

The request message may include a HyperText Transfer Protocol (HTTP) request message, e.g., an XHR (Xml HTTP Request) message. The store of intercept request messages may include a synchronization log that includes time stamps for each intercepted request message that is stored in the synchronization log.

The second step 84 may further include intercepting only request messages that meet one or more predetermined conditions as specified via a configured scope.

The fourth step 88 may further include generating one or more mock responses to each of the one or more intercepted request messages; and issuing the one or more mock responses to the networked software application in response to intercepting one or more request messages.

The first example method 80 may further specify that the method is implemented via a JavaScript Extensions Toolkit (JET) online toolkit for capturing REST calls whilst the client is offline and then replaying the captured messages in guaranteed order once the application reconnects, i.e., goes online. HTTP requests meeting one or more predetermined criteria, i.e., a configured scope may be persisted in a sync log, and mock responses may be provided to the client by the toolkit when the client is offline.

Accordingly, the offline persistent toolkit and associated embodiments discussed herein greatly simplify application development, e.g., by providing a response caching solution that works well across modern browsers. The toolkit covers common caching cases with a minimal amount of application-specific coding, but provides flexibility to cover non-trivial cases as well. In addition to providing the ability to cache complete response payloads, the toolkit supports "shredding" of REST response payloads into objects that can be stored, queried, and updated on the client device while offline.

Figure 4:
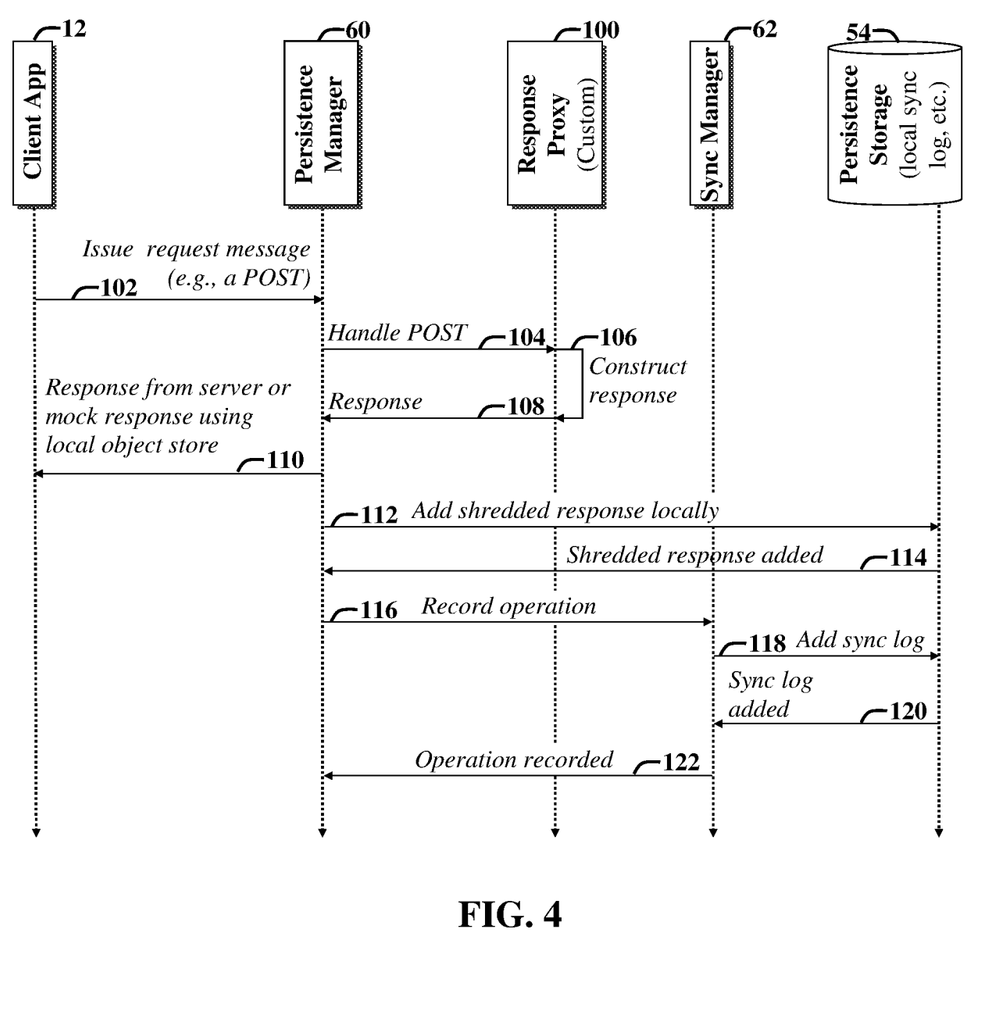
FIG. 4 is a first sequence diagram showing example communications between a client application, persistence manager, response proxy, synchronization (sync) manager, and local persistence storage, during an example scenario wherein the client application is offline.

FIG. 4 is a first sequence diagram showing example communications between a client application 12, persistence manager 60, response proxy 100, synchronization (sync) manager 62, and local persistence storage 54, during an example scenario wherein the client application 12 is offline, e.g., not in communication with a remote server.

In the present example scenario, the client application 12 issues an initial request message 102, which in this example, is a POST 102. The request message 102 is then intercepted by the persistence manager 60, which then passes the intercepted POST message 104 to a response proxy 100 for processing.

Note that the response proxy 100 may include custom code for determining how a given request message should be handled when the client application 12 is offline and/or based on other contextual parameters (e.g., connection speed, location, particular type of data to be posted, retrieved, etc.).

In the present example embodiment, the response proxy 100 has been configured to either provide a mock response to the client application 12 or to retrieve a response from a remote REST server (i.e., the server 74 of FIG. 5, to which the request message 102 is directed by the client application 12) and provide the retrieved response to the client application 12, depending upon whether the client application 12 is currently offline or online, respectively.

Accordingly, the response proxy 100 returns a response 108, which may or may not be a mock response. For the purposes of the present discussion, a response is called a mock response if the REST response message is constructed using locally stored and shredded data. The construction of the response message may involve accessing a local persistence store (e.g., the persistence storage 54) that includes shredded and stored (e.g., in a local database) request message payloads and response payloads.

To generate a mock response to a given request message, the response proxy 100 may activate a de-shredder (also called unshredder) to unshred data from the local persistence storage 54 for use in constructing a response message payload. Header information used to construct the mock response may be obtained from a local metadata cache, which may also be part of the local persistence storage 54.

In the present example embodiment, the response 108 from the response proxy 100 represents a mock response 110 created using a local object store that is part of the persistence storage 54. The persistence manager 60 forwards the mock response 110 to the client application 12.

Note that the client application 12 may treat the mock response 110 as though it were an actual response from the remote server that the client application 12 intended to call via the request message 102.

The persistence manager 60 then passes the response 112 to the persistence storage 54 for storage. However, note that persistence manager 60 first leverages shredder functionality (e.g., from a shredder included in or in communication with the persistence manager 60) to shred the response message 110 to facilitate storage of the payload data of the response message in the persistence storage 54.

The persistence storage 54 then issues a confirmation 114 to the persistence manager 60 that the shredded response 112 was successfully stored in the persistence storage 54.

The persistence manager 60 then issues an operation-recording signal 116 to the sync manager 62, so as to record the operation, including the issuance of a response message 110 to the client application. The response message 110 may be forwarded to the sync manager 62 along with the operation-recording signal 116.

The sync manager 62 then logs a time-stamped copy of the response message 110 in a sync log that is included among the local persistence storage 54. A confirmation 120 that the response message 110 was logged in the sync log is forwarded to the sync manager 62 from the local persistence storage 54. The sync manager 62 then informs that the sync log and associated persistence storage 54 has been successfully updated.

Figure 5:
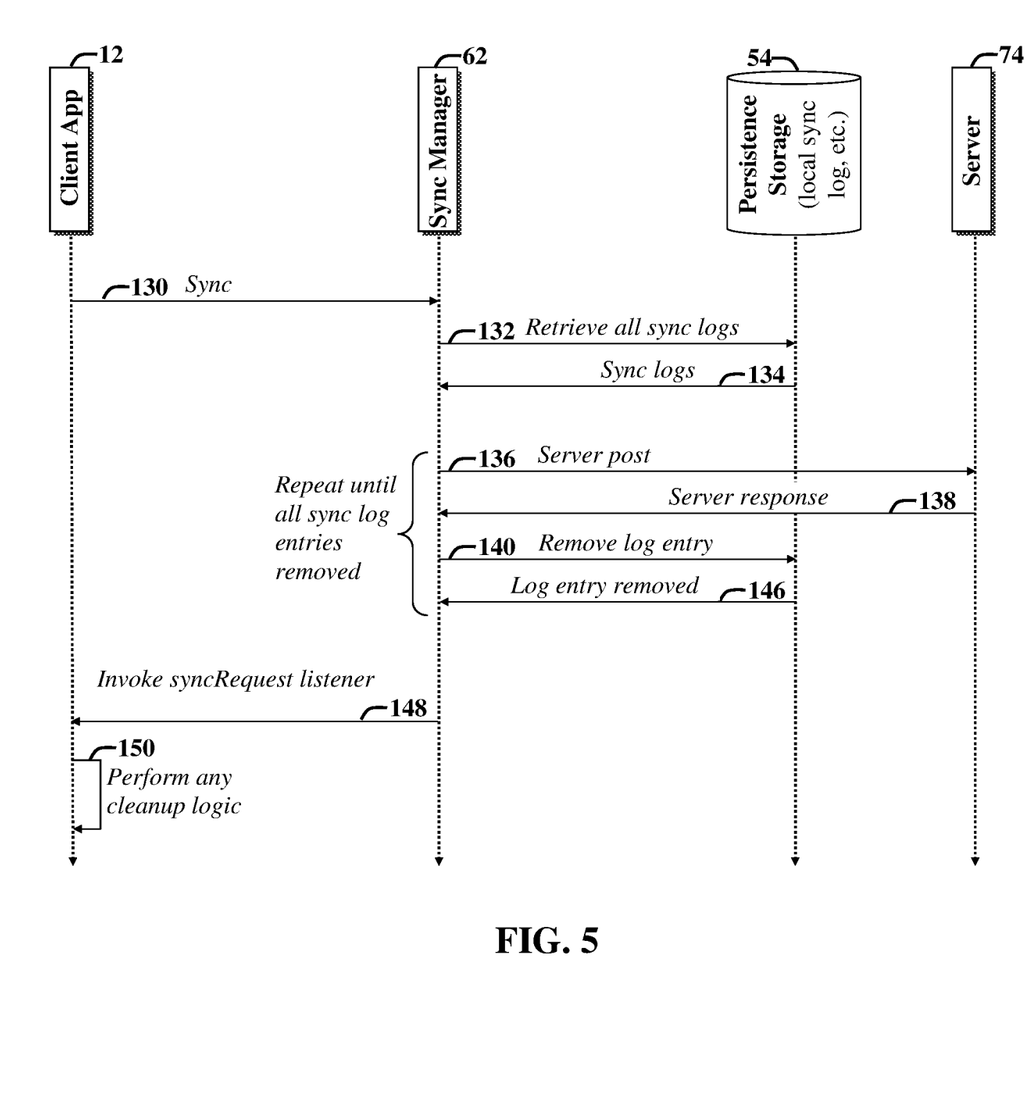
FIG. 5 is a second sequence diagram showing example communications between the client application, sync manager, persistence storage, and a remote server when the client application of FIG. 4 transitions to being online, i.e., connects with the server to interact therewith.

FIG. 5 is a second sequence diagram showing example communications between the client application 12, sync manager 62, persistence storage 54, and a remote REST server 74 when the client application 12 of FIG. 4 transitions to being online, i.e., can connect with the server 74 to interact therewith.

In the present example embodiment, the client application 12 issues a command to the sync manager 62 to begin a client-server synchronization operation. This may occur, for instance, when a mobile device running the client application 12 is docked to a desktop computer; when network connectivity is reestablished, and/or based on other criteria.

Furthermore, note that while the client application 12 is shown sending a synchronization request to the sync manager 62 that the synchronization signal 130 may, alternatively, or in addition, be issued by the persistence manager 60 of FIGS. 2 and 4 based on communications with the online/offline determination mechanism 18 of FIG. 1.

The sync manager 62 then issues a log-retrieval signal 132 to the persistence storage 54 to retrieve all sync log entries from the sync log thereof. Note that sync log entries in the sync log of the persistence storage 54 include time stamped (or otherwise sequenced) request messages and corresponding response messages.

Each request message from the sync log of the persistence storage 54 is played back to the REST server 74, which then generates a server response 138. The server response 138 can be compared to any corresponding mock response that was generated client-side, and any synchronization adjustments may be made in response (e.g., in accordance with client-side cleanup software used to perform step 150, as discussed more fully below).

After the sync manager 62 receives the server response 138 pertaining to a particular sync log entry 136, the corresponding sync log entry is removed at step 140 from the sync log of the persistence storage 54, and the persistence storage 54 confirms removal of the log entry via a confirmation signal 146. Note that steps 136-146 are performed until all sync log request-message entries are removed from the persistence storage 54, or until the synchronization process is otherwise determined to have been completed.

The sync manager 62 then issues a listener-invocation signal 148 to the client application 12 to invoke a synchronization request listener (syncRequestlistener) and to perform any additional cleanup logic 150. The listener-invocation signal 148 may be used by the client application 12 and/or persistence manager 60 of FIG. 4 as an indicator that a particular synchronization process has completed, and that the synch manager 62 is ready to handle additional synchronization requests.

The cleanup logic step 150 may further include, for instance, implementing conflict resolution algorithms. For example, in certain scenarios, a particular data field may have been updated both client-side, e.g., while the client application 12 was offline, and server side, e.g., while another user was accessing the database. Upon reconnect and synchronization, steps to reconcile and/or to otherwise select which data should be kept, may vary depending upon the needs of a given implementation. For example, in some implementations, an enterprise may prompt the user to choose which data to keep when a conflict occurs.

Figure 6:
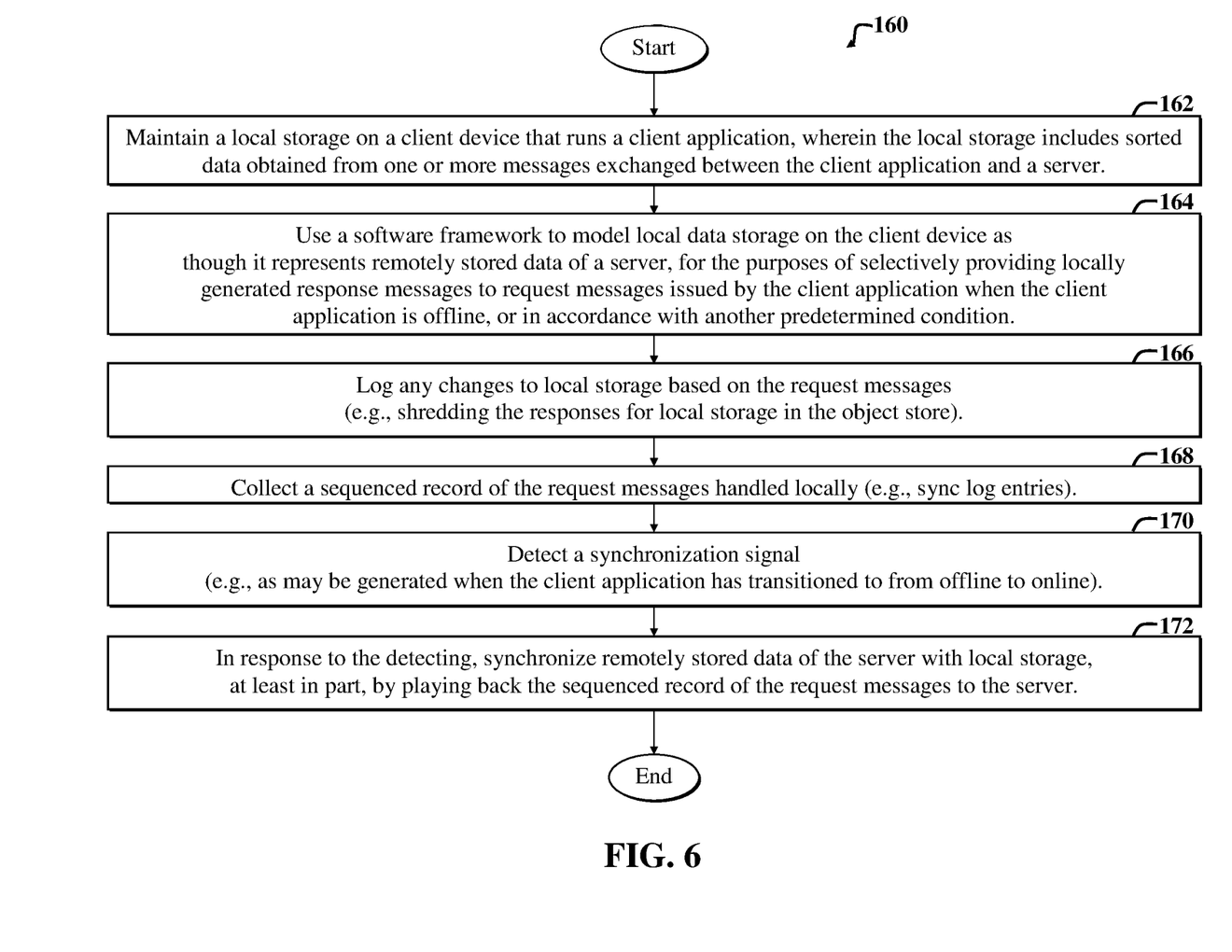
FIG. 6 is a flow diagram of a second example method that is suitable for use with the embodiments of FIGS. 1-5.

FIG. 6 is a flow diagram of a second example method 160 that is suitable for use with the embodiments of FIGS. 1-5. The second example method 160 facilitates operation of a client application during periods of intermittent network connectivity.

An initial storage-maintaining step 162 includes maintaining a local storage on a client device (e.g., smartphone, tablet, laptop, etc.) that runs a client application, wherein the local storage includes data obtained from one or more messages exchanged between the client application and a server.

Next, a framework-using step includes using a software framework to model local data storage (e.g., the persistence storage 54 of FIGS. 4 and 5) on the client device as though it represents remotely stored data of a server (e.g., the REST server 74 of FIGS. 2 and 5), for the purposes of selectively providing locally generated response messages to request messages issued by the client application (e.g., the client application 12 of FIG. 4) when the client application is offline, or in accordance with another predetermined condition.

Subsequently, a change-logging step 166 includes logging any changes to local storage based on the request messages (e.g., shredding the responses for local storage in the object store).

Next, a record-collecting step 168 includes collecting a sequenced record of the request messages handled locally (e.g., sync log entries).

Subsequently, a sync-detecting step 170 includes detecting a synchronization signal (e.g., as may be generated when the client application has transitioned to from offline to online).

A last synchronizing step 172 includes, in response to the detecting, synchronizing remotely stored data of the server with local storage, at least in part, by playing back the sequenced record of the request messages to the server (e.g., the server 74 of FIG. 5).

Note that the second example method 160 may be modified, without departing from the scope of the present teachings, e.g., steps may be altered, interchanged, removed, added, and so on. For example, the method 160 may further include various additional steps, such as: intercepting one or more request messages addressed to the server; processing the request message to generate a mock response message based on data in the local storage, including manipulating data in the local storage as needed in accordance with request message; delivering the mock response message to the client application; and logging a record of the generated mock response message in a synchronization log.

Figure 7:
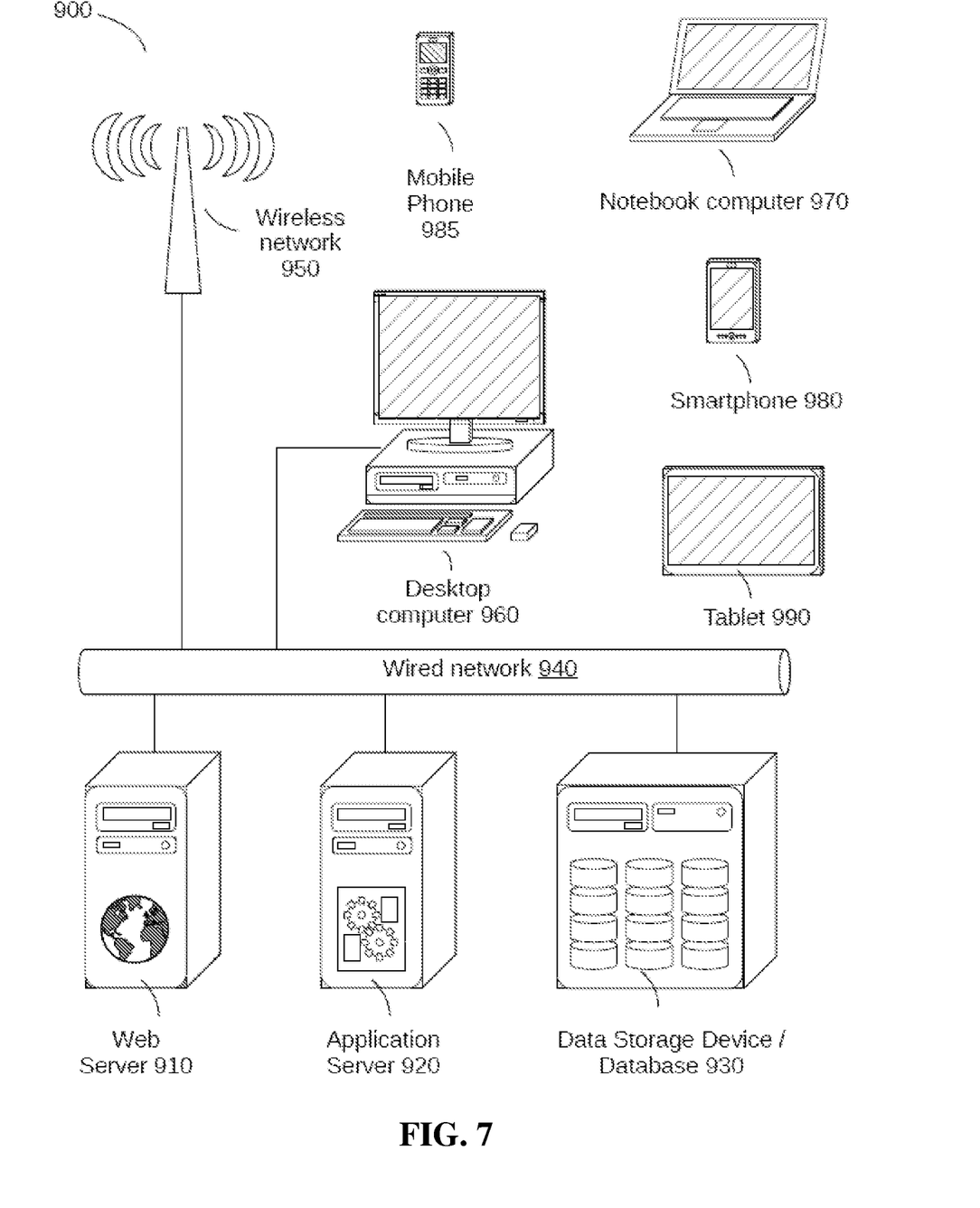
FIG. 7 is a general block diagram of a system and accompanying computing environment usable to implement the embodiments of FIGS. 1-6.

FIG. 7 is a general block diagram of a system 900 and accompanying computing environment usable to implement the embodiments of FIGS. 1-6. The example system 900 is capable of enabling efficient configuration and generation of dynamic UI display screens for web applications. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can be created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Figure 8:
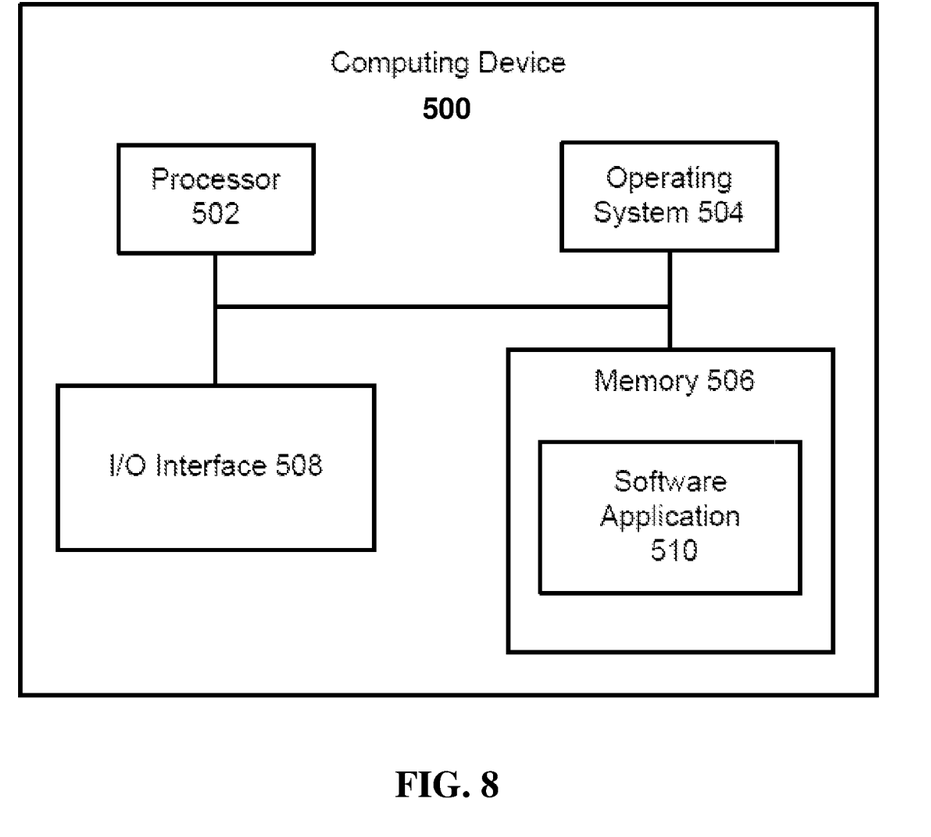
FIG. 8 is a general block diagram of a computing device usable to implement the embodiments of FIGS. 1-7.

FIG. 8 illustrates a block diagram of an example computing device 500, which may be used for implementations described herein. For example, computing device 500 may be used to implement server devices 910, 920 of FIG. 7 as well as to perform the method implementations described herein. In some implementations, computing device 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing device 500 may be implemented by one or more processors or any combination of hardware devices, as well as any combination of hardware, software, firmware, etc.

For ease of illustration, FIG. 8 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing device 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein employ a JavaScript library to implement request message interception, caching, and synchronized replaying to server-side computing resource(s), embodiments are not limited thereto. Other types of programming languages may be used (other than JavaScript), and other interfacing mechanisms (other than software libraries) may be employed to implement embodiments in accordance with the present teachings, without departing from the scope thereof.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

An example apparatus for facilitating operation of a networked software application that communicates with a network resource during periods of intermittent network connectivity comprise: means for determining when a networked software application is offline and when it is online; means for selectively intercepting one or more request messages from the networked software application addressed to a network resource when the software application is offline, resulting in a store of intercepted request messages; means for detecting when the networked software application transitions from being offline to being online; and means for selectively issuing the one or more request messages to the network resource in a sequence in which the one or more request messages were stored in the store of intercepted request messages.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory tangible processor-readable medium including instructions executable by one or more processors, and when executed operable for:
   selectively intercepting request messages from a networked software application addressed to a network resource when the networked software application is offline, resulting in intercepted request messages in a storage;
   providing a synchronization log having log entries for each intercepted request messages, wherein the synchronization log includes data to enable providing the request messages to the network resource in a particular order;
   when the networked software application transitions from being offline to being online, issuing a log-retrieval signal to the storage to retrieve all of the log entries to provide the request messages to the network resource in the particular order;
   receiving request message responses from the network resource for corresponding intercepted request messages; and
   in response to receiving the request message responses, removing the log entries corresponding to the intercepted request messages from the synchronization log.

2. The tangible processor-readable medium of claim 1, wherein the particular order is in a sequence in which the request messages were stored in the storage.

3. The tangible processor-readable medium of claim 1, wherein the network resource includes a REpresentational State Transfer (REST) service, the networked software application is a REST client of the REST service, and the request messages are REST calls.

4. The tangible processor-readable medium of claim 3, wherein the REST calls are generated by:
   a client device that includes the networked software application, receiving client input to a user interface implemented via HyperText Transfer Protocol (HTTP) and JavaScript associated with a website, and
   webpage code generating one or more events that trigger JavaScript calls that are routed through an interfacing software and converted into the associated REST calls.

5. The tangible processor-readable medium of claim 4, wherein the interfacing software includes an Asynchronous JavaScript and XML (AJAX) engine.

6. The tangible processor-readable medium of claim 1, further comprising:
   receiving a confirmation signal from the storage indicating the removal of the log entries.

7. The tangible processor-readable medium of claim 1, wherein the instructions executable by one or more processors are further operable for:
   detecting a synchronization signal that may be generated when the networked software application has transitioned from offline to online; and
   in response to the detecting, synchronizing remotely stored data of a server with local storage, at least in part, by the providing of the request messages to the network resource.

8. A method for facilitating operation of a networked software application that communicates with a network resource during periods of intermittent network connectivity, the method comprising:
   selectively intercepting request messages from a networked software application addressed to a network resource when the networked software application is offline, resulting in intercepted request messages in a storage;
   providing a synchronization log having log entries for each intercepted request messages, wherein the synchronization log includes data to enable providing the request messages to the network resource in a particular order;
   when the networked software application transitions from being offline to being online, issuing a log-retrieval signal to the storage to retrieve all of the log entries to provide the request messages to the network resource provide the request messages to the network resource in the particular order;
   receiving request message responses from the network resource for corresponding intercepted request messages; and
   in response to receiving the request message responses, removing the log entries corresponding to the intercepted request messages from the synchronization log.

9. The method of claim 8, wherein the particular order is in a sequence in which the request messages were stored in the storage.

10. The method of claim 8, wherein the network resource includes a REpresentational State Transfer (REST) service, the networked software application is a REST client of the REST service, and the request messages are REST calls.

11. The method of claim 10, wherein the REST calls are generated by:
   a client device that includes the networked software application, receiving client input to a user interface implemented via HyperText Transfer Protocol (HTTP) and JavaScript associated with a website, and webpage code generating one or more events that trigger JavaScript calls that are routed through an interfacing software and converted into the associated REST calls.

12. The method of claim 11, wherein the interfacing software includes an Asynchronous JavaScript and XML (AJAX) engine.

13. The method of claim 8, wherein the instructions executable by one or more processors are further operable for:
receiving a confirmation signal from the storage indicating the removal of the log entries.

14. The method of claim 8, wherein the instructions executable by one or more processors are further operable for:
detecting a synchronization signal that may be generated when the networked software application has transitioned from offline to online; and
in response to the detecting, synchronizing remotely stored data of a server with local storage, at least in part, by the providing of the request messages to the network resource.

15. An apparatus comprising:
one or more processors; and
logic encoded in one or more tangible media for execution by the one or more processors and when executed operable for:
selectively intercepting request messages from a networked software application addressed to a network resource when the networked software application is offline, resulting in intercepted request messages in a storage;
providing a synchronization log having log entries for each intercepted request messages, wherein the synchronization log includes data to enable providing the request messages to the network resource in a particular order;
when the networked software application transitions from being offline to being online, issuing a log-retrieval signal to the storage to retrieve all of the log entries to provide the request messages to the network resource provide the request messages to the network resource in the particular order;
receiving request message responses from the network resource for corresponding intercepted request messages; and
in response to receiving the request message responses, removing the log entries corresponding to the intercepted request messages from the synchronization log.

16. The apparatus of claim 15, wherein the particular order providing of the request messages to the network resource is in a sequence in which the request messages were stored in the storage.

17. The apparatus of claim 15, wherein the network resource includes a REpresentational State Transfer (REST) service, the networked software application is a REST client of the REST service, and the request messages are REST calls.

18. The apparatus of claim 17, wherein the REST calls are generated by:
a client device that includes the networked software application, receiving client input to a user interface implemented via HyperText Transfer Protocol (HTTP) and JavaScript associated with a website, and
webpage code generating one or more events that trigger JavaScript calls that are routed through an interfacing software and converted into the associated REST calls.

19. The apparatus of claim 18, wherein the interfacing software includes an Asynchronous JavaScript and XML (AJAX) engine.

20. The apparatus of claim 15, wherein the logic, when executed, is further operable for:
receiving a confirmation signal from the storage indicating the removal of the log entries.

* * * * *